United States Patent Office 2,743,501
Patented May 1, 1956

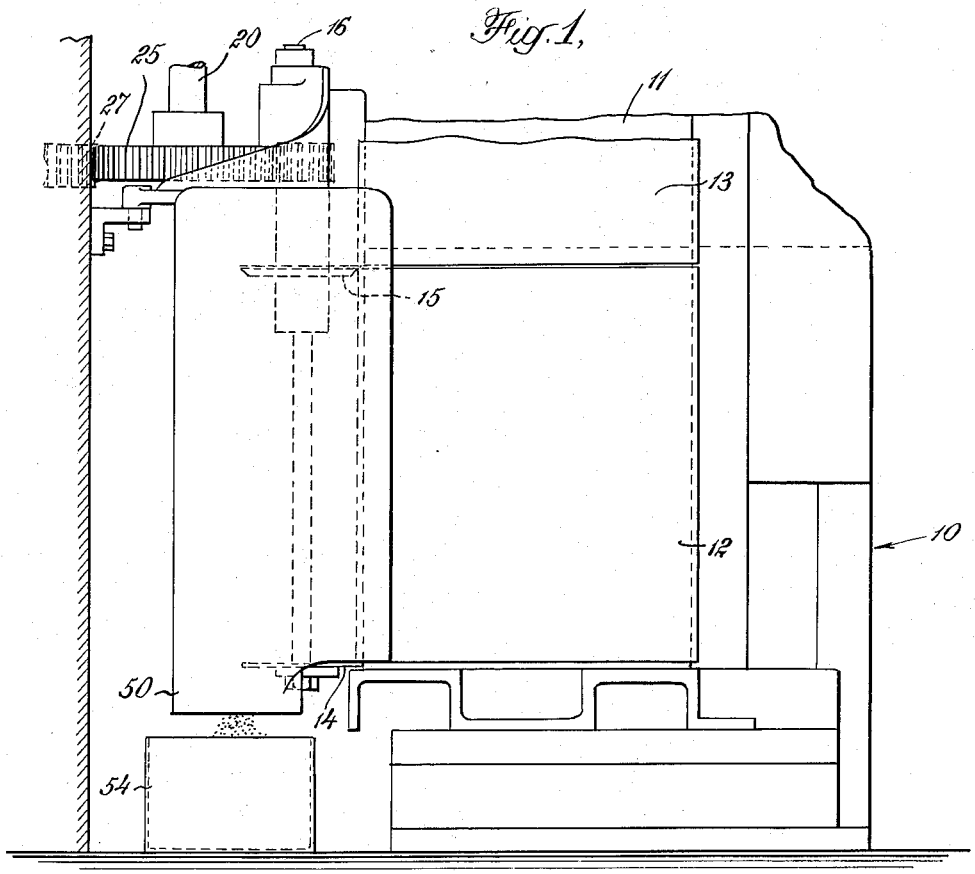
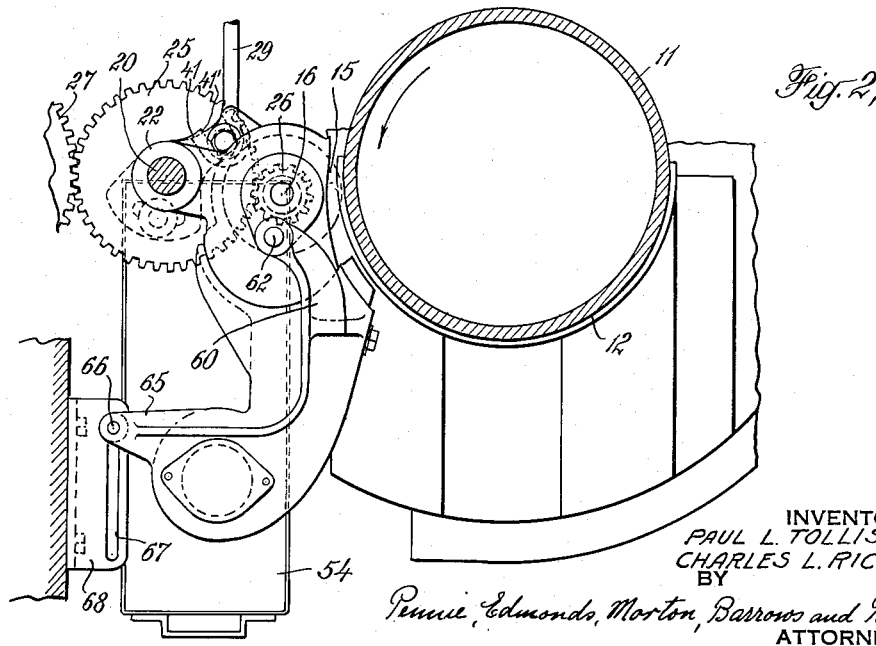

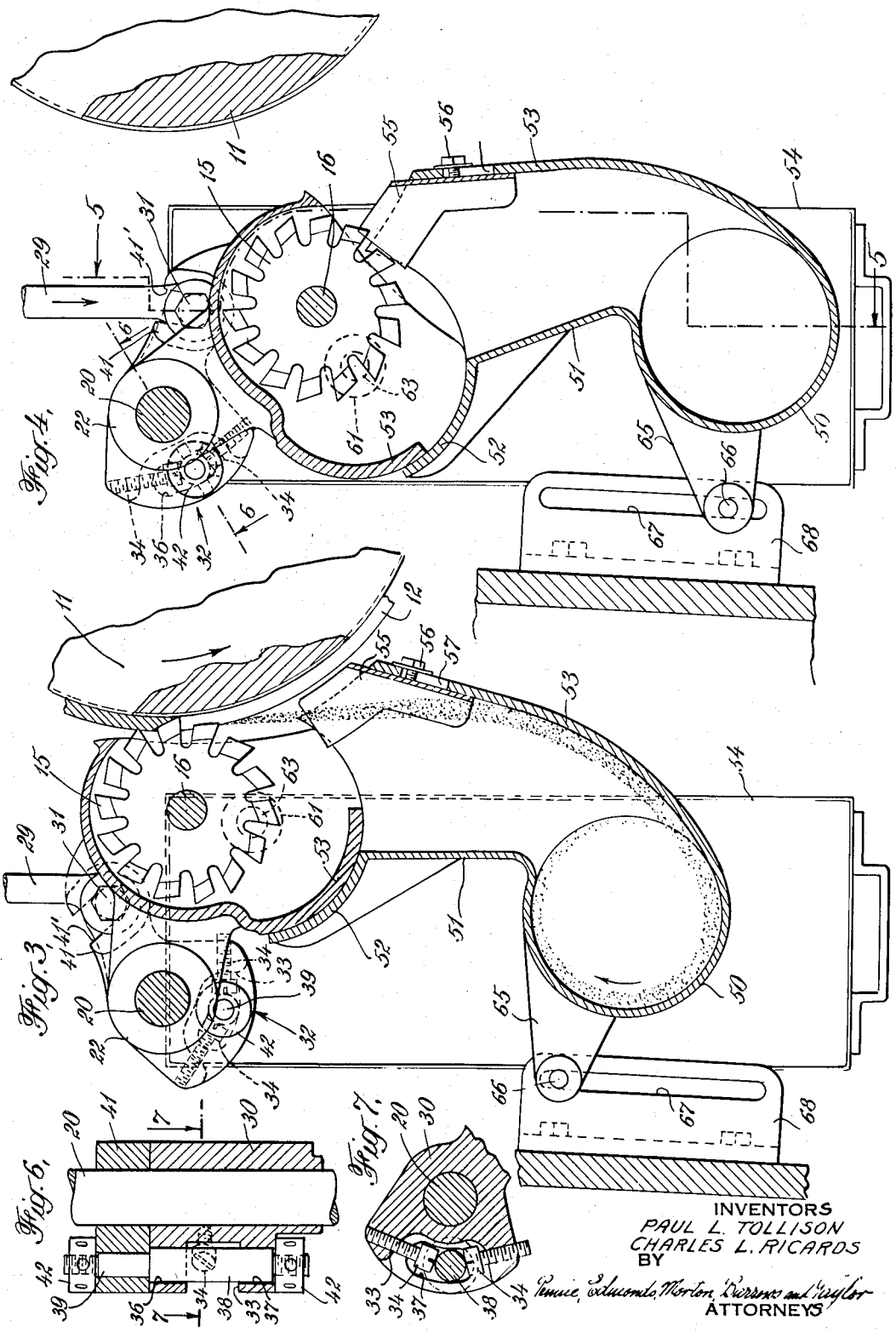

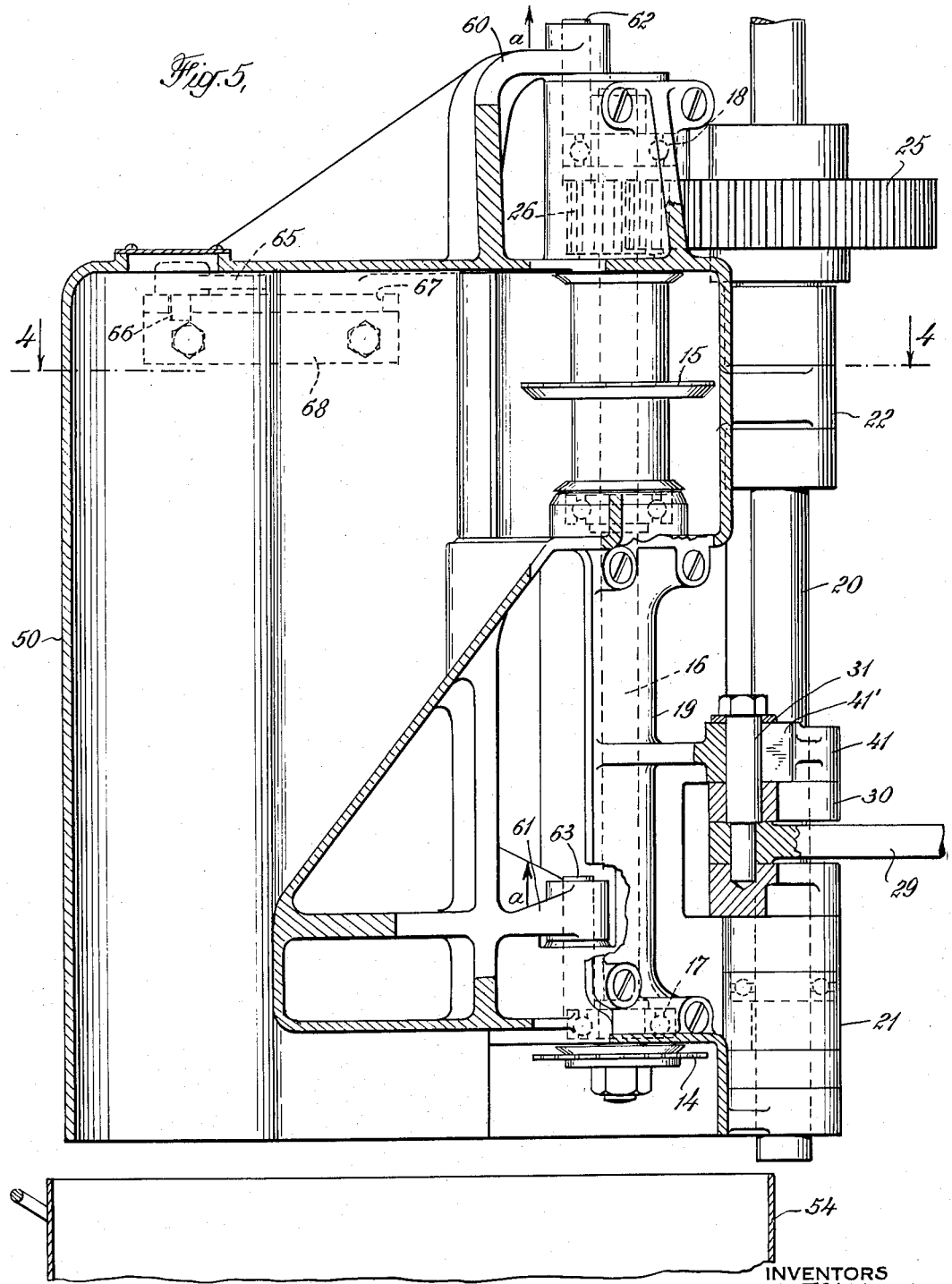

2,743,501

SAW CHIP COLLECTOR

Paul L. Tollison, North Plainfield, and Charles L. Ricards, South Plainfield, N. J., assignors to Wood Newspaper Machinery Corporation, Plainfield, N. J., a corporation of Virginia Application January 22, 1953, Serial No. 332,676

5 Claims. (Cl. 29—21)

This invention relates to an improved saw chip collector and more particularly concerns an improved saw mounting and chip collector mechanism for use in removing the riser or tail from and trimming the lower edge of a cast stereotype plate as it is rotated about a core about which it has been cast.

In one known form of stereotype plate making machine, substantially semi-cylindrical plates are successively cast in a mold space defined by a concave semi-cylindrical casting box and the opposite halves of a cylindrical core mounted to turn about its axis which is customarily vertically disposed. After each plate is cast, the casting box is retracted and the core is turned about its axis through a half revolution to remove the cast plate from the casting box. Thereafter, the casting box is again moved into close proximity with the newly presented half of the core to define the mold space, and another plate is cast.

In order to insure the proper density of the metal forming the cast plate, the metal is cast to a considerably greater depth axially of the core than is required, and a so-called riser or tail extends for some distance above the useful portion of the plate on which the type is cast. It is necessary to remove this riser from the plate and to trim the lower edge of the plate before the plate is subjected to further finishing operations. This is customarily accomplished by moving rotating saws into close proximity with the core to sever the plate along the top and bottom curved edges of its useful portion as the core is turned, whereby the plate is fed to the saws and trimmed as the core turns the plate out of the casting box. During this operation, the saws produce a quantity of hot metal chips and dust which are driven outwardly tangentially of the saws at high velocity. In previously known constructions, this saw debris not only constitutes a hazard to operating personnel, but the flying chips and dust clog associated mechanism and frequently ricochet from adjacent objects and strike and adhere to the type bearing surface of the stereotype plates, producing undesirable spots and imperfections in the type which appear as black spots on the printed sheets subsequently produced by the plates.

According to this invention, a saw chip collector is provided for removable mounting on the saw supporting mechanism or hanger. The chip collector has a chip-intercepting section which, when the saws are in operative cutting position, lies in the paths of the chips being thrown tangentially from the saws to intercept them. The chip-intercepting section of the chip collector leads with a gradually decreasing radius of curvature into a substantially cylindrical chamber of the collector where the chips brought into the collector will move in a circular path until their velocity has diminished to such an extent that they fall downwardly in the chamber. The bottom end of the chamber is open and a hopper is placed under this open end to catch the falling chips. Hence all of the saw chips or debris thrown by the saws in cutting and trimming a stereotype printing plate on the core of the casting machine are collected, deactivated and deposited in a collection hopper.

As previously indicated, the saws are mounted for movement into and out of engagement with stereotype plates as cast on the core of a casting machine. Hence also is the chip collector, and the invention therefore contemplates the provision of a chip guard extension adjustably mounted on the chip-intercepting section of the collector opposite each saw to permit greater adjustment of this section of the collector relative to the core than may be afforded by its mounting on the saw hanger. A fixed guide is also provided for connection with the cylindrical chamber portion of the collector in order to confine the movement thereof to a substantially straight line path above the hopper when the collector as a whole is moved with the saw hanger. The movement of the saw hanger and chip collector is between two limiting positions, the operative cutting position and the inoperative position. It is contemplated that means be provided to effect adjustment of this movement, and particularly adjustment of the operative limiting position of the saw hanger.

These and other novel features of the invention will be better understood by reference to the following more detailed description of one embodiment of the invention in connection with the illustration thereof in the accompanying drawings, in which:

Fig. 1 is an elevation of a part of a stereotype plate casting machine associated with which is a sawing apparatus and chip collector;

Fig. 2 is a plan view of the apparatus of Fig. 1;

Fig. 3 is an enlarged sectional plan view of the chip collector and the saw attachment both in operative position;

Fig. 4 is a sectional plan view similar to that of Fig. 3 but showing the saw attachment and chip collector in inoperative position. This section is taken on line 4—4 of Fig. 5;

Fig. 5 is an elevation in section of the saw attachment and chip collector taken on line 5—5 of Fig. 4;

Fig. 6 is a fragmentary section in elevation of the adjusting means for varying the limits of movement of the saw hanger and is taken along line 6—6 of Fig. 4; and Fig. 7 is a section taken along line 7—7 of Fig. 6.

Referring to Figs. 1 and 2 of the drawings, there is illustrated a portion of a stereotype plate casting machine including a frame indicated generally at 10 in which is mounted a core 11 adapted to be rotated about its vertical axis for the casting of stereotype printing plates 12, one of which is shown thereon. To remove the plate 12 from the core, the latter is rotated in the direction of the arrow in Fig. 2. The plate as cast includes a riser 13 at its upper end which must be removed. The plate also must be trimmed along its lower edge. The removal of the riser and the trimming of the lower edge of the plate is effected during the aforementioned rotation of the core 11 by a pair of saws 14 and 15 which, as illustrated in Figs. 1, 2 and 3, are about to complete such an operation.

The saws 14 and 15 which are of a type that cut beveled edges are mounted on a vertical drive shaft 16 riding in bearings 17 and 18 in the housing 19 of a saw hanger. The saw hanger is pivotally mounted on a main supporting shaft 20 by brackets 21 and 22 secured to the housing 19 and is adapted to be pivoted thereabout. A driving gear 25 is freely mounted on shaft 20 and meshes with a pinion 26 mounted on vertical drive shaft 16 for the saws 14 and 15. The saw hanger housing 19 in which drive shaft 16 is mounted is, as indicated, adapted to pivot about main support shaft 20 and hence so also is drive shaft 16, the pinion 26 remaining in engagement with gear 25 during such pivotal movement. Gear 25 is operatively connected to the drive motor (not shown) of the casting machine through a gear 27 (Figs. 1 and 2).

The saw hanger and the saws 14 and 15 are moved toward and away from the core 11 of the casting machine by a rod 29 (Figs. 3, 4 and 5) which is connected to one end of a bracket 30 by a pin 31, the bracket 30 being mounted on shaft 20. The other end of the bracket 30 is connected to the saw hanger through adjustment means indicated generally at 32 which will be hereinafter described. Hence movement of rod 29 is imparted to the saw hanger and effects the latter's pivotal movement about shaft 20 toward and away from core 11. The operating rod 29 may be connected through cam means, not shown, to the operating mechanism for the casting machine, the latter also not being shown, so that the movement of the saw hanger is correlated with the movement of the core of the casting apparatus in order that the saws may be moved toward the core to cut and trim a stereotype printing plate as it is being moved to discharge position by the core of the casting machine.

The adjusting means 32 includes the bracket 30 mentioned above to one end of which is connected the operating rod 29. Referring particularly to Figs. 3, 4, 6 and 7, the other end of the bracket 30 is provided with a recess 33 in the end walls of which are mounted adjusting screws 34 which may be threaded so as to extend a greater or shorter distance into the recess 33. Arcuate slots 36, 37 are provided in member 30 and lie above and below recess 33. An adjusting pin 38 extends through the slots 36, 37 and recess 33 and has an upper portion 39 extending through a circular bore hole 40 in one end of a bracket 41 which also is pivotally mounted on shaft 20. Nuts 42 maintain pin 39 in place. The other end of bracket 41 is fixedly secured to the saw hanger and hence upon pivotal movement of bracket 30 about shaft 20 by rod 29, the saw hanger is pivoted thereabout by reason of the pin connection between brackets 30 and 41. A slot 41' in said other end of bracket 41 permits free movement of pin 31.

To effect a change in the limits of pivotal movement of the saw hanger about the shaft 20, the limits of pivotal movement of the bracket 30 by rod 29 being constant, adjustment screws 34 are adjusted to position pin 38 in a different position in the arcuate slots 36, 37 of bracket 30. Hence the limit of movement of the saws toward core 11 may be adjusted to accommodate a wearing of the saw teeth, the use of new saws, etc.

Referring now to Figs. 3, 4 and 5 particularly, the saw chip collector comprises a casing having a vertically disposed substantially cylindrical chamber section 50 and a back wall 51 (Figs. 3 and 4) which terminates in an arcuate section 52 having sliding engagement with a complementary arcuate section 53 of the saw hanger housing. This overlapping of a section of the chip collector with a section of the saw hanger housing prevents the escape of saw chips between the two. The chip collector also has a front wall 53 which forms an extension of a portion of the cylindrical chamber 50 and extends with an increasing radius of curvature outwardly therefrom to a terminal section of substantially infinite radius. As may be seen in Fig. 3, this terminal section of the saw chip collector is adapted when the saws are in contact with and cutting a stereotype printing plate to lie in the path of travel of chips being thrown by the saw in a direction tangentially of the section of the saw in contact with the plate.

The curvature of portion 53 and of the chamber 50 of the chip collector gradually changes the direction of travel of the chips from a straight line to a circular path, at the same time decreasing the speed thereof by frictional contact. The chips continue to rotate in the cylindrical chamber 50 until their velocity is such that they fall downwardly therein. A hopper 54 placed below the saw chip collector receives the falling chips and stores them for removal.

The outer end of the section 53 of the saw chip collector is provided with a pair of chip guard extensions, only the upper one 55 of which is shown in Figs. 3 and 4, it being located horizontally opposite upper saw 15. A similar chip guard extension, however, is provided on the lower portion of section 53 of the chip collector opposite the lower saw 14. These chip guard extensions are secured to section 53 of the chip collector by bolts 56 passing through slots 57 therein. Hence they may be adjusted outwardly or inwardly on section 53 of the collector if desired.

The saw chip collector is provided with upper and lower outrigger brackets 60 and 61, respectively (Fig. 5). The outer ends of these brackets are provided with bores adapted to receive studs 62 and 63, respectively, the studs being mounted in the saw hanger housing 19 whereby the chip collector may be pivotally and readily removably mounted on the saw hanger. For removal, the chip collector is merely lifted in the direction of the arrows a so that the brackets 60 and 61 become disengaged with the studs 62 and 63.

A third outrigger bracket 65 extends from the cylindrical chamber end of the chip collector outwardly therefrom and carries at its distal end a guide pin 66. The guide pin is adapted to be received in a slot 67 of a guide 68 which is fixed to a stationary portion of the frame 10. It will be noted that guide slot 67 is canted slightly to fulfill its purpose of confining the center of the cylindrical chamber 50 of the chip collector to a straight line path.

Various changes and modifications may of course be made in the particular apparatus above described and illustrated in the accompanying drawings without departing from the invention and the scope of the invention should therefore be limited only to the extent set forth in the appended claims.

We claim:

1. A saw chip collector comprising a substantially cylindrical hollow body portion, a curved lead-in portion extending from said body portion with a gradually increasing radius of curvature, and terminating in a section of substantially infinite radius, and means for mounting said chip collector on a stereotype plate trimming saw housing with its terminal section positioned to intercept in a substantially tangential direction any chips thrown by a saw in the saw housing when the collector is mounted on the saw housing and the saw is in cutting engagement with a stereotype plate.

2. A saw chip collector according to claim 1 which includes a chip guard extension adjustably mounted on said terminal section.

3. A saw chip collector according to claim 1 which includes means for removably mounting said collector on the stereotype plate trimming saw housing.

4. A saw chip collector according to claim 1 in which the chips intercepted thereby are led into the substantially cylindrical hollow body portion in a curved path which becomes circular when the chips have traveled a substantial distance into the cylindrical hollow body portion and which includes means for confining the travel of the chips to such circular path until their speed in the plane of a cut made by a saw decreases until they fall through the cylindrical hollow body portion.

5. A saw chip collector according to claim 1 which includes means for pivotally mounting said chip collector on the stereotype plate trimming saw housing and which includes means interconnecting said chip collector to a stationary chip collector guide to confine movement of the substantially cylindrical hollow body portion of the collector to a straight line path.

References Cited in the file of this patent

UNITED STATES PATENTS

| | | |
|---|---|---|
| 1,814,578 | Wood | July 14, 1931 |
| 2,118,410 | Lofstedt | May 24, 1938 |
| 2,158,249 | Olander | May 16, 1939 |
| 2,531,647 | Roesen et al. | Nov. 28, 1950 |
| 2,581,220 | Tollinson et al. | Jan. 1, 1952 |